United States Patent
Lee et al.

(10) Patent No.: US 11,245,858 B2
(45) Date of Patent: Feb. 8, 2022

(54) ELECTRONIC DEVICE AND METHOD FOR PROVIDING IMAGE OF SURROUNDINGS OF VEHICLE

(71) Applicant: Samsung Electronics Co., Ltd., Gyeonggi-do (KR)

(72) Inventors: Taehee Lee, Gyeonggi-do (KR); Jihye Kim, Gyeonggi-do (KR); Sahnggyu Park, Gyeonggi-do (KR); Seunghoon Han, Gyeonggi-do (KR); Boseok Moon, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/960,744

(22) PCT Filed: Dec. 27, 2018

(86) PCT No.: PCT/KR2018/016714
§ 371 (c)(1),
(2) Date: Jul. 8, 2020

(87) PCT Pub. No.: WO2019/135544
PCT Pub. Date: Jul. 11, 2019

(65) Prior Publication Data
US 2020/0358966 A1    Nov. 12, 2020

(30) Foreign Application Priority Data

Jan. 8, 2018    (KR) .................. 10-2018-0002253

(51) Int. Cl.
*H04N 7/18*    (2006.01)
*H04N 5/265*    (2006.01)
(Continued)

(52) U.S. Cl.
CPC ............... *H04N 5/265* (2013.01); *B60R 1/00* (2013.01); *G06T 5/002* (2013.01); *G06T 5/009* (2013.01);
(Continued)

(58) Field of Classification Search
CPC .... H04N 5/265; H04N 5/23229; H04N 5/247; H04N 2013/0088; H04N 13/239;
(Continued)

(56) References Cited

U.S. PATENT DOCUMENTS 10,582,122 B2    3/2020  Okada
2003/0190090 A1*  10/2003  Beeman ................. G06T 11/60
                                            382/284
(Continued)

FOREIGN PATENT DOCUMENTS

JP    2007334859    12/2007
JP    2010095086     4/2010
(Continued)

OTHER PUBLICATIONS

PCT/ISA/210 Search Report issued on PCT/KR2018/016714, dated Apr. 1, 2019, pp. 5.
(Continued)

*Primary Examiner* — Shan E Elahi
(74) *Attorney, Agent, or Firm* — The Farrell Law Firm, P.C.

(57) ABSTRACT

Provided is an electronic apparatus and method for providing an image of surroundings of a vehicle. The electronic apparatus for providing an image of surroundings of the vehicle includes a first image sensor creating a first image by capturing surroundings of the vehicle; a second image sensor creating a second image by capturing surroundings of the vehicle; and a processor configured to obtain feature information of each of the first image and the second image
(Continued)

and use a portion of the first image and a portion of the second image to create a composite image that represents the surroundings of the vehicle, based on the obtained feature information.

15 Claims, 15 Drawing Sheets

(51) Int. Cl.
| | | |
|---|---|---|
| *G06T 7/55* | (2017.01) | |
| *B60R 1/00* | (2006.01) | |
| *G06T 5/00* | (2006.01) | |
| *G06T 5/50* | (2006.01) | |
| *H04N 5/232* | (2006.01) | |
| *H04N 5/247* | (2006.01) | |

(52) U.S. Cl.
CPC .................. *G06T 5/50* (2013.01); *G06T 7/55* (2017.01); *H04N 5/23229* (2013.01); *H04N 5/247* (2013.01); *B60R 2300/105* (2013.01); *B60R 2300/20* (2013.01); *B60R 2300/303* (2013.01); *G06T 2207/10028* (2013.01); *G06T 2207/20021* (2013.01); *G06T 2207/20208* (2013.01); *G06T 2207/20221* (2013.01); *G06T 2207/30252* (2013.01)

(58) Field of Classification Search
CPC .............. H04N 13/271; H04N 5/2258; H04N 5/23238; H04N 2013/0081; G06T 7/55; G06T 5/002; G06T 5/009; G06T 5/50; G06T 2207/10028; G06T 2207/20021; G06T 2207/20208; G06T 2207/20221; G06T 2207/30252; G06T 2207/10012; G06T 7/11; G06T 7/50; B60R 1/00; B60R 2300/105; B60R 2300/20; B60R 2300/303
USPC ........................................................ 348/148
See application file for complete search history.

(56) References Cited

U.S. PATENT DOCUMENTS

| | | |
|---|---|---|
| 2010/0060735 A1 | 3/2010 | Sato |
| 2012/0062694 A1 | 3/2012 | Muramatsu |
| 2012/0119985 A1* | 5/2012 | Kang .................... G06F 3/0304 345/156 |
| 2012/0262607 A1 | 10/2012 | Shimura et al. |
| 2013/0250068 A1 | 9/2013 | Aoki |
| 2015/0022693 A1* | 1/2015 | Appia ....................... G06T 5/50 348/239 |
| 2015/0187083 A1 | 7/2015 | Yoon et al. |
| 2016/0012299 A1* | 1/2016 | Maeda ....................... G06T 7/20 382/104 |
| 2016/0286122 A1* | 9/2016 | Snavely .................... G09G 5/00 |
| 2017/0132480 A1 | 5/2017 | Han |
| 2017/0150039 A1 | 5/2017 | Jeong et al. |
| 2017/0353722 A1* | 12/2017 | Jung .................... H04N 19/147 |
| 2017/0361759 A1* | 12/2017 | Kim ...................... G01C 21/365 |
| 2018/0007315 A1* | 1/2018 | Kim .................. H04N 5/23287 |
| 2018/0077417 A1* | 3/2018 | Huang ................... H04N 19/70 |
| 2018/0111554 A1* | 4/2018 | Pearce ................. G08G 1/0112 |

FOREIGN PATENT DOCUMENTS

| | | |
|---|---|---|
| JP | 2013211035 | 10/2013 |
| JP | 5367640 | 12/2013 |
| JP | 2015207862 | 11/2015 |
| KR | 1020090101480 | 9/2009 |
| KR | 1020170119508 | 10/2017 |
| WO | WO 2017/217238 | 12/2017 |

OTHER PUBLICATIONS

PCT/ISA/237 Written Opinion issued on PCT/KR2018/016714, dated Apr. 1, 2019, pp. 14.
European Search Report dated Dec. 23, 2020 issued in counterpart application No. 18897985.0-1210, 6 pages.

\* cited by examiner

ELECTRONIC DEVICE AND METHOD FOR PROVIDING IMAGE OF SURROUNDINGS OF VEHICLE

PRIORITY

This application is a National Phase Entry of PCT International Application No. PCT/KR2018/016714 which was filed on Dec. 27, 2018, and claims priority to Korean Patent Application No. 10-2018-0002253, which was filed on Jan. 8, 2018, the content of each of which is incorporated herein by reference.

TECHNICAL FIELD

The disclosure relates to an electronic apparatus and method for providing images of surroundings of a vehicle, and more particularly, to an electronic apparatus and method for creating a composite image that represents the surroundings of a vehicle by using portions of a plurality of images captured by the electronic apparatus equipped with a plurality of image sensors.

BACKGROUND ART

With the development of network and multimedia technologies, technologies are emerging to provide various services for a user on board a vehicle by using a plurality of images captured by an electronic device in the vehicle. For example, there is a technology being developed to guide more reliable autonomous driving of a vehicle while providing the user with information about a distance between the vehicle and an object in a vicinity of the vehicle by capturing a plurality of images via a plurality of image sensors.

Furthermore, a technology is required to provide a high quality service for a vehicle user by obtaining images that represent surroundings of the vehicle more accurately even when it is dark around the vehicle.

DESCRIPTION OF EMBODIMENTS

Technical Problem

Some embodiments of the disclosure provide an electronic apparatus and method for creating a composite image that represents the surroundings of a vehicle using a plurality of images captured with a plurality of image sensors.

Furthermore, some embodiments of the disclosure provide an electronic apparatus and method for calculating a distance between the vehicle and a subject included in the plurality of images based on a distance between the plurality of image sensors.

Moreover, some embodiments of the disclosure provide an electronic apparatus and method for estimating a distance between the vehicle and a subject included in a single image.

BEST MODE

Figure 1:
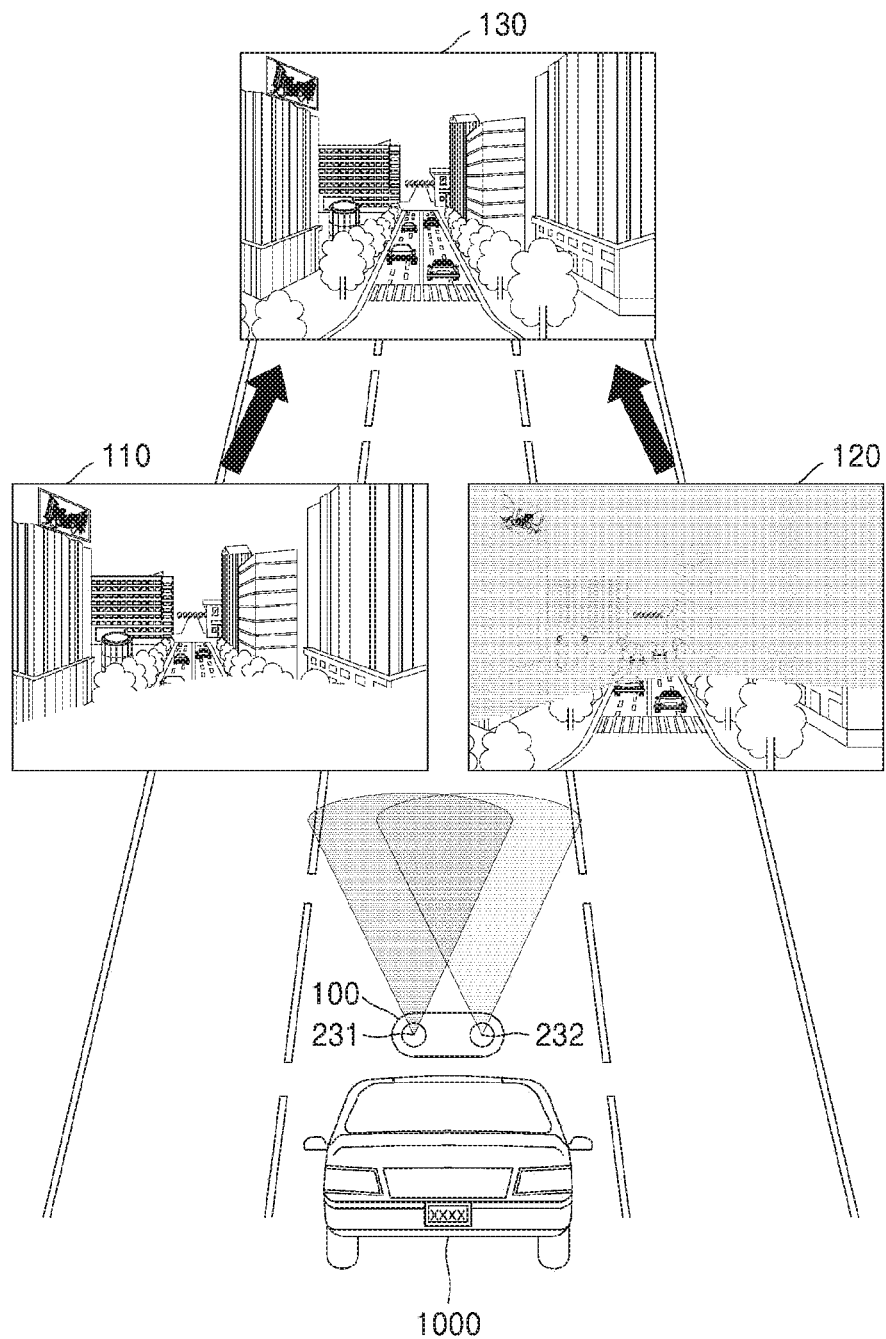
FIG. 1 illustrates how an electronic apparatus in a vehicle creates a composite image that represents surroundings of the vehicle, according to some embodiments of the disclosure.

According to a first aspect of the disclosure, an electronic apparatus for providing an image of surroundings of a vehicle includes a first image sensor creating a first image by taking surroundings of the vehicle; a second image sensor creating a second image by taking surroundings of the vehicle; and a processor configured to obtain feature information of each of the first image and the second image and use a portion of the first image and a portion of the second image to create a composite image that represents the surroundings of the vehicle, based on the obtained feature information.

According to a second aspect of the disclosure, a method for providing an image of surroundings of a vehicle in an electronic apparatus includes creating a first image by a first image sensor of the electronic apparatus capturing surroundings of the vehicle; creating a second image by a second image sensor of the electronic apparatus capturing surroundings of the vehicle; obtaining feature information of each of the first image and the second image; and using a portion of the first image and a portion of the second image to create a composite image that represents the surroundings of the vehicle, based on the obtained feature information.

According to a third aspect of the disclosure, provided is a computer-readable recording medium having the method of claim 11 executed by a computer.

MODE OF DISCLOSURE

Embodiments of the disclosure will now be described with reference to accompanying drawings to assist those of ordinary skill in the art in readily implementing them. However, the embodiments of the disclosure may be implemented in many different forms, and not limited thereto as will be discussed herein. In the drawings, parts unrelated to the description are omitted for clarity, and like numerals refer to like elements throughout the specification.

When A is said to "be connected" to B, it means to be "directly connected" to B or "electrically connected" to B with C located between A and C. The term "include (or including)" or "comprise (or comprising)" is inclusive or open-ended and does not exclude additional, unrecited elements or method steps, unless otherwise mentioned.

The terms including ordinal numbers such as 'first', 'second', and so on in the following description may be used to explain different elements or to distinguish an element from another, or may be used for convenience of explanation.

The disclosure will now be described with reference to accompanying drawings.

FIG. 1 illustrates how an electronic apparatus in a vehicle creates a composite image that represents surroundings of the vehicle, according to some embodiments of the disclosure.

Referring to FIG. 1, an electronic apparatus 100 in a vehicle 1000 may use a first image sensor 231 to capture a first image 110 and a second image sensor 232 having different physical characteristics from the first image sensor 231 to capture a second image 120. The electronic apparatus 100 may obtain feature information of the first image 110 and feature information of the second image 120, and create a composite image 130 that represents surroundings of the vehicle 1000 by using a portion of the first image 110 and a portion of the second image 120 based on the feature information of the first image 110 and the feature information of the second image 120. The first and second images may be similar images captured in substantially the same time and same direction. The composite image 130 may be created using just clear portions of the first and second images 110 and 120. Accordingly, the electronic apparatus 100 may create the composite image 130 that represents surroundings of the vehicle 1000 more accurately even under a dark environment.

Furthermore, the electronic apparatus 100 may capture a subject located around the vehicle 1000, and create the composite image 130 that even represents a distance between the subject included in at least one of the first and second images 110 and 120 and the vehicle 1000.

Throughout the specification, the feature information refers to information for registering a plurality of images, and may include, but not exclusively to, position information on an image, such as intersections, borderlines, edges, peaks, valleys, cone sections, etc., which represent a feature of the image, brightness information of a plurality of areas in the image, and distance information of the plurality of areas in the image. For example, the feature information may include information relating to a road on which the vehicle 1000 is driving, including, for example, information about a shape of the road, a terrain of the road, and a subject around the road, and further information about a slope of the road, curvature of the road, lane width, a structure around the road, etc. Moreover, the feature information may include distance information indicating a distance between a subject included in each of the plurality of areas in the image and the vehicle 1000.

Physical characteristics of a sensor may include exposure time, ISO gain sensitivity, and a lens aperture ratio, without being limited thereto.

The particular subject may refer to a subject included in both the first image and the second image.

Furthermore, the electronic apparatus 100 may transmit or receive data used for creating the composite image 130 that represents surroundings of the vehicle 1000 to or from another electronic apparatus (not shown) or a server (not shown) over a network. The other electronic apparatus (not shown) or the server (not shown) may perform some of operations of the electronic apparatus 100, which will be described later, to create the composite image 130 that represents the surroundings of the vehicle 1000, and transmit or receive data for creating the composite image 130 to or from the electronic apparatus 100.

The electronic apparatus 100 may be a device for providing an image of the surroundings of the vehicle 1000, e.g., a stereo camera of a black box of the vehicle 1000. Alternatively, the electronic apparatus 100 may be an electronic device connected to a head unit of the vehicle 1000, e.g., a smart phone, a tablet personal computer (PC), a PC, a smart television, a portable phone, a personal digital assistant (PDA), a laptop, a media player, a micro server, a navigation device, and any other mobile or non-mobile computing device, without being limited thereto. In addition, the electronic apparatus 100 may be a wearable device, such as a watch, glasses, a hair band, and a ring, each of which has a communication function and a data processing function. It is not, however, limited thereto, and the electronic apparatus 100 may include any kind of device equipped with a plurality of image sensors for capturing the surroundings of the vehicle 1000 and capable of creating the composite image. In this case, the electronic apparatus 100 may be connected to the head unit of the vehicle 1000 through wired/wireless communication. For example, the electronic apparatus 100 may be connected to the head unit of the vehicle 1000 through wireless LAN (Wi-Fi), Buetooth, Bluetooth low energy, Zigbee, Wi-Fi Direct (WFD), ultra wideband (UWB), infrared data association (IrDA), near field communication (NFC), etc., without being limited thereto.

The network may include a local area network (LAN), a wide area network (WAN), a value added network (VAN), a mobile radio communication network, a satellite communication network, and any combination thereof, which is a comprehensive data communication network allowing constituent entities to perform smooth communication with each other to implement what is described in the disclosure, including the cable Internet, the wireless Internet, and a mobile wireless communication network.

Figure 2:
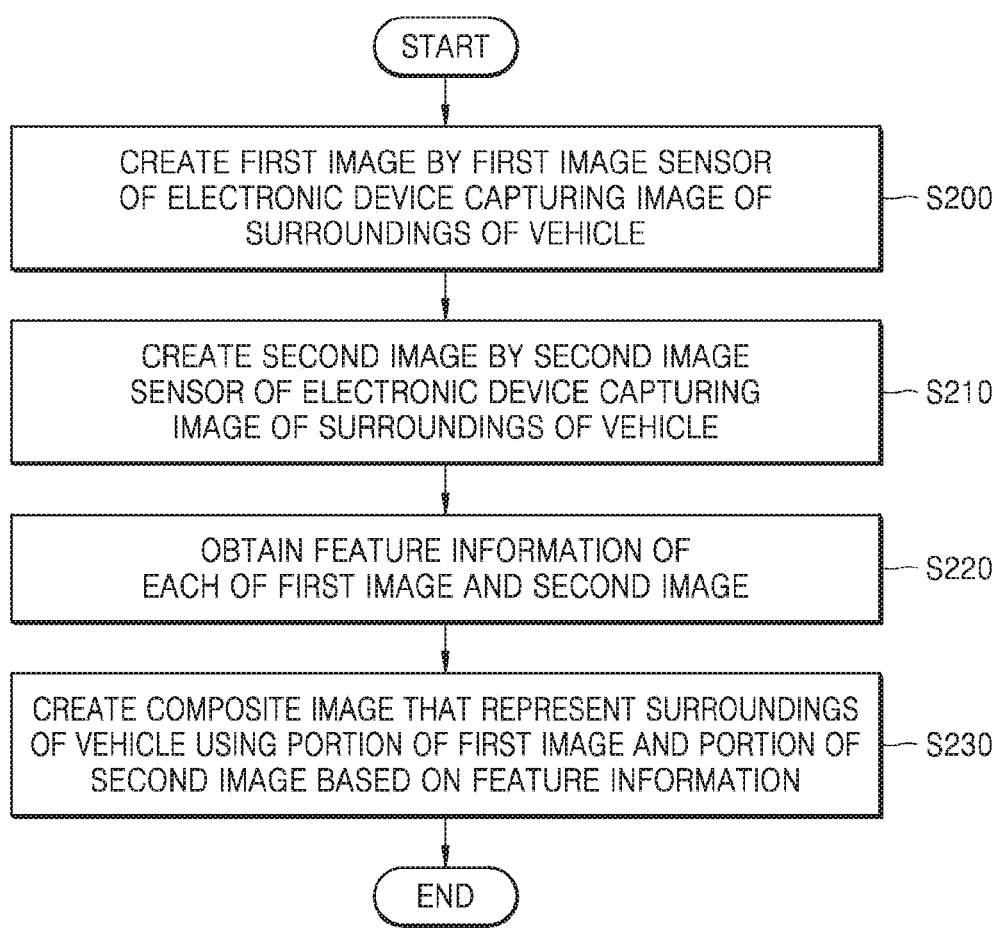
FIG. 2 is a flowchart of a method in which an electronic apparatus creates a composite image that represents surroundings of a vehicle based on feature information, according to some embodiments of the disclosure.

FIG. 2 is a flowchart of a method in which an electronic apparatus provides a composite image that represents surroundings of a vehicle, according to some embodiments of the disclosure.

In operation S200, a first image may be created by a first image sensor of the electronic apparatus 100 capturing surroundings of the vehicle 1000. The electronic apparatus 100 may take pictures of a plurality of objects around the vehicle 1000 by controlling the first image sensor directed to the surroundings of the vehicle 1000. The electronic apparatus 100 may be, but not exclusively to, a camera installed at the vehicle 1000 at a stage of manufacturing the vehicle 1000. Furthermore, the electronic apparatus 100 may be a camera installed at the vehicle by the user, in which case the electronic apparatus 100 may be communicatively connected to the vehicle 1000. For example, the electronic apparatus 100 may include a camera of a black box device or a camera of a smart phone, without being limited thereto. The electronic apparatus 100 may control the first image sensor to capture an image of the front, side or back from the vehicle 1000, and the electronic apparatus 100 may be a movable camera, a rotational camera, or a fixed camera.

In operation S210, a second image may be created by the second image sensor of the electronic apparatus 100 capturing surroundings of the vehicle 1000. The electronic apparatus 100 may capture a plurality of objects around the vehicle 1000 by controlling the second image sensor directed to the surroundings of the vehicle 1000. The second image sensor may have different physical characteristics from those of the first image sensor. For example, the first image sensor may be a highly sensitive image sensor and the second image sensor may be a normally sensitive image sensor. The electronic apparatus 100 may control the second image sensor to capture an image of the front, side or back from the vehicle 1000. For example, the first and second image sensors may be arranged at a distance to each other in the electronic apparatus 100, and controlled by the electronic apparatus 100 to capture images in substantially the same direction. Furthermore, the first and second image sensors may be controlled by the electronic apparatus 100 to create first and second images by capturing the surroundings of the vehicle 1000 at substantially the same time. For example, while the vehicle 1000 is driving, the electronic apparatus 100 may capture the front from the vehicle 1000 by controlling the first and second image sensors.

In operation S220, the electronic apparatus 100 may obtain feature information of each of the first and second images.

The feature information may be used to create a composite image by registering the first and second images, including e.g., position information on an image e.g., intersections, borderlines, edges, peaks, valleys, cone sections, etc., that represent a feature of the image and brightness information of a plurality of areas in the image.

The image registration is a processing method of transforming images of a scene or an object obtained from different coordinate systems into one coordinate system, when the scene or the object is captured from different times or viewpoints.

The electronic apparatus 100 may extract feature information from the first image and feature information from the second image. Alternatively, the electronic apparatus 100 may receive the feature information of each of the first and second images from a server or another electronic apparatus. In this case, the electronic apparatus 100 may request feature information of the first image and feature information of the second image from the server or the other electronic apparatus while transmitting first image data of the first image and second image data of the second image to the server or the other electronic device.

In operation S230, the electronic apparatus 100 may use a portion of the first image and a portion of the second image to create a composite image that represents the surroundings of the vehicle, based on the feature information.

The electronic apparatus 100 may register the first and second images such that common portions included in the first and second images overlap each other, based on the feature information of the first image and the feature information of the second image. For example, the electronic apparatus 100 may register the first and second images by comparing shapes of a road on which the vehicle 1000 is driving, terrains of the road, slopes of the road, curvatures of the road, structures around the road, lane widths, etc., between the first and second images. Alternatively, the electronic apparatus 100 may register the first and second images by comparing shapes, average brightness, and extents of areas having smooth or similar changes in brightness information between the first and second images.

Furthermore, the electronic apparatus 100 may create a composite image by selecting a clearer one from among the common portions included in the first and second images. Moreover, for a portion not included in the second image but included in the first image, the electronic apparatus 100 may insert the portion of the first image to the composite image. In addition, for a portion not included in the first image but included in the second image, the electronic apparatus 100 may insert the portion of the second image to the composite image. Accordingly, the electronic device 100 may create a wide dynamic range (WDR) image or high dynamic range (HDR) image having a wider dynamic range than the first or second image as a composite image. Furthermore, the electronic device 100 may use portions of the first and second images to create a composite image with noise further reduced than in the first and second images.

Figure 3:
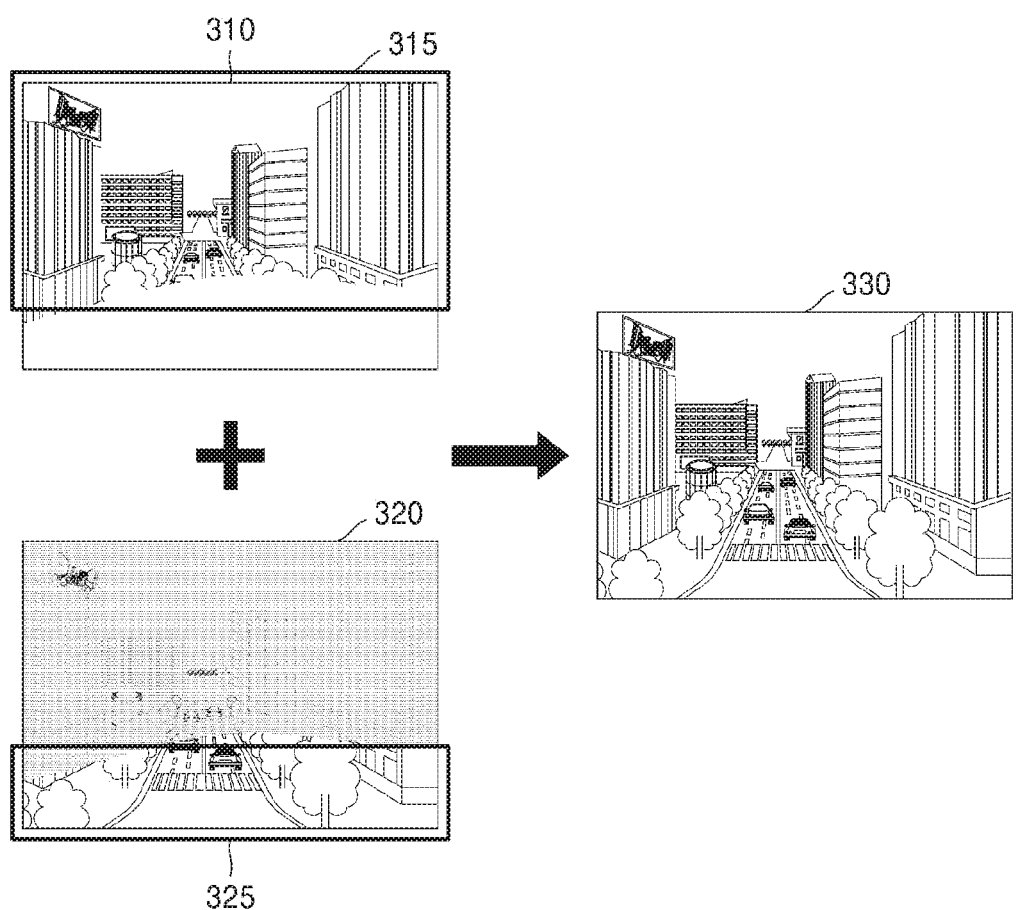
FIG. 3 illustrates how an electronic apparatus creates a composite image using a portion of a first image and a portion of a second image, according to some embodiments of the disclosure.

FIG. 3 illustrates how an electronic apparatus creates a composite image using a portion of a first image and a portion of a second image, according to some embodiments of the disclosure.

Referring to FIG. 3, the electronic apparatus 100 may obtain a first image 310 and a second image 320 by taking the front from the vehicle 1000. The first image 310 is captured by the first image sensor with high sensitivity, and may have a portion in which a subject may be hardly identified. Furthermore, the second image 320 is captured by the second image sensor with normal sensitivity, and may have a portion in which a subject may be hardly identified. As the first and second image sensors differ in sensitivity, subjects hardly identified in the second image 320 may be identifiable in a portion 315 of the first image 310. Furthermore, subjects hardly identified in the first image 310 may be identifiable in a portion 325 of the second image 320. To obtain a clearer image, the electronic apparatus 100 may create a composite image 330 by synthesizing the portion 315 of the first image and the portion 325 of the second image.

Figure 4:
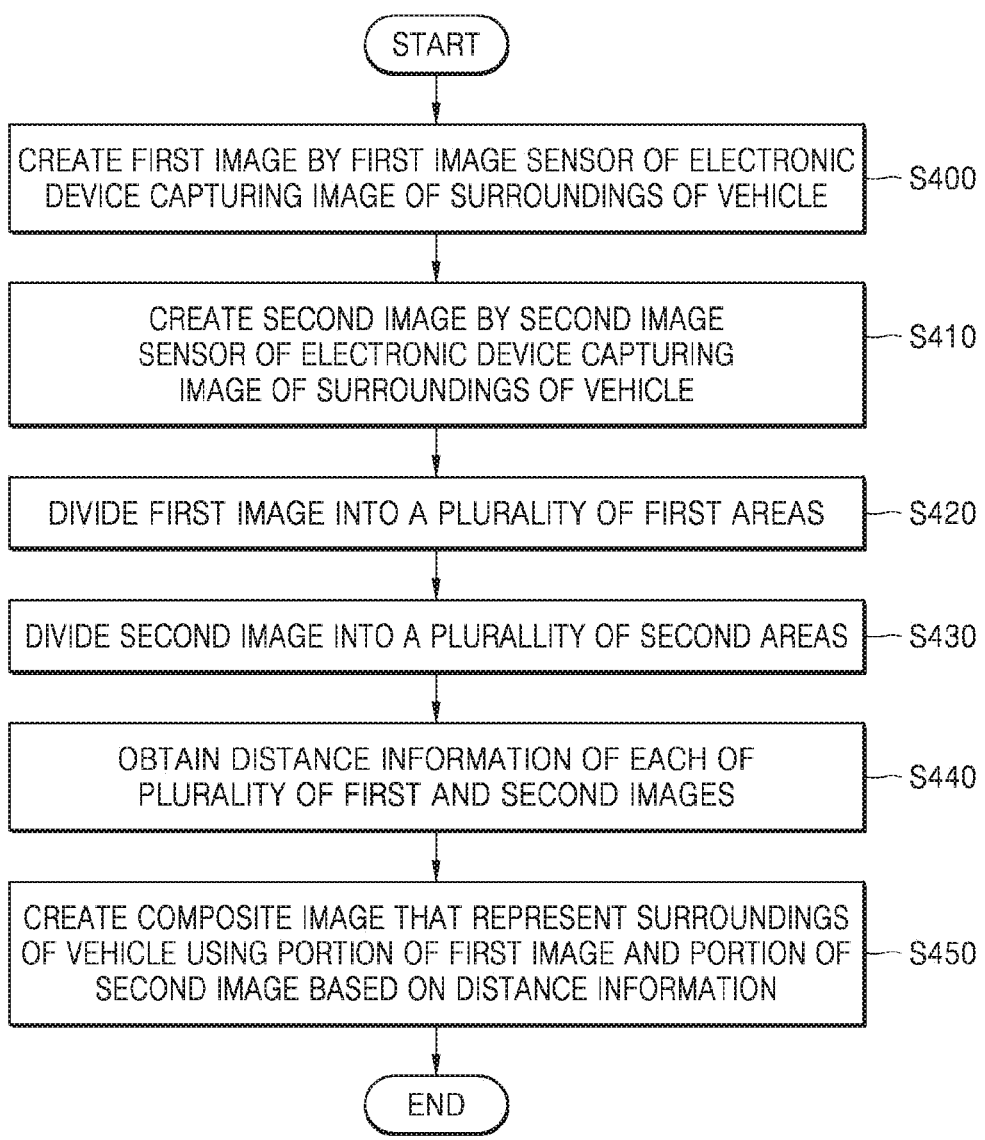
FIG. 4 is a flowchart of a method in which an electronic apparatus creates a composite image that represents surroundings of a vehicle based on distance information, according to some embodiments of the disclosure.

FIG. 4 is a flowchart of a method in which an electronic apparatus creates a composite image that represents surroundings of a vehicle based on distance information, according to some embodiments of the disclosure.

In operation S400, a first image may be created by the first image sensor of the electronic apparatus 100 capturing the surroundings of the vehicle 1000, and in operation S410, a second image may be created by the second image sensor of the electronic apparatus 100 capturing the surroundings of the vehicle 1000.

The operation S400 corresponds to the operation S200 of FIG. 2, and the operation S410 corresponds to the operation S210 of FIG. 2, so the detailed description will be omitted.

In operation S420, the electronic apparatus 100 may divide the first image into a plurality of first areas. In an embodiment of the disclosure, the electronic apparatus 100 may divide the first image into the plurality of first areas by dividing the first image into multiple blocks. In this case, all the plurality of first areas may have the same size and same shape. Alternatively, the electronic apparatus 100 may divide the first image into the plurality of first areas having irregular shapes. For example, the electronic apparatus 100 may divide the first image into the plurality of first areas around subjects included in the first image.

In operation S430, the electronic apparatus 100 may divide the second image into a plurality of second areas. The operation S430 corresponds to the operation S420, so the detailed description will be omitted.

In operation S440, the electronic apparatus 100 may obtain distance information of each of the plurality of first and second areas. The electronic apparatus 100 may obtain the distance information between a subject included in one of the plurality of first areas and the vehicle 1000. Furthermore, the electronic apparatus 100 may obtain the distance information between a subject included in one of the plurality of second areas and the vehicle 1000.

In an embodiment of the disclosure, the electronic apparatus 100 may obtain the distance information of each of the plurality of first and second areas based on a distance between the first and second image sensors, image data of the plurality of first areas, and image data of the plurality of second areas.

Alternatively, the electronic apparatus 100 may obtain the distance information of each of the plurality of first and second areas using a range sensor. The range sensor may be used to detect an object in front of the vehicle 1000 and calculate a distance to the object, and may include e.g., a radar sensor, a Lidar sensor, and an ultrasound sensor, without being limited thereto.

The electronic apparatus 100 may sense the front from the vehicle 1000 with a certain range sensor while taking the front from the vehicle 1000. For example, when the vehicle 1000 is driving on a road, there may be a plurality of subjects located in front of the vehicle 1000. Furthermore, the electronic device 100 may transmit a sensing signal toward the front from the vehicle 1000 while taking the front from the vehicle 1000, and receive the sensing signal reflecting off the plurality of subjects. The plurality of objects may be located around the vehicle 1000, and transmission of a signal and reception of a reflecting signal may be performed by the electronic apparatus 100 while the electronic apparatus 100 is taking the plurality of subjects with the first image sensor and/or the second image sensor. Furthermore, the electronic apparatus 100 may calculate a distance between the subject and the vehicle 1000 based on the signal reflecting from the plurality of subjects.

A specific example of obtaining the distance information of each of the plurality of first and second areas will be described later with reference to FIGS. 7 to 12.

In operation S450, the electronic apparatus 100 may use a portion of the first image and a portion of the second image to create a composite image that represents the surroundings of the vehicle, based on the distance information. The electronic apparatus 100 may select a second area matching a particular one of the plurality of first areas based on the distance information of each of the plurality of first and second areas. Furthermore, the electronic apparatus 100 may determine a clearer one of the particular first area and the second area that matches the particular first area, and insert the determined area to the composite image.

Alternatively, the electronic apparatus 100 may create a depth image that represents distances between the vehicle 1000 and subjects included in at least one of the first and second images based on the distance information of each of the plurality of first and second areas.

An example of the electronic apparatus 100 creating a composite image based on the distance information will be described later with reference to FIGS. 5 and 6.

Figure 5:
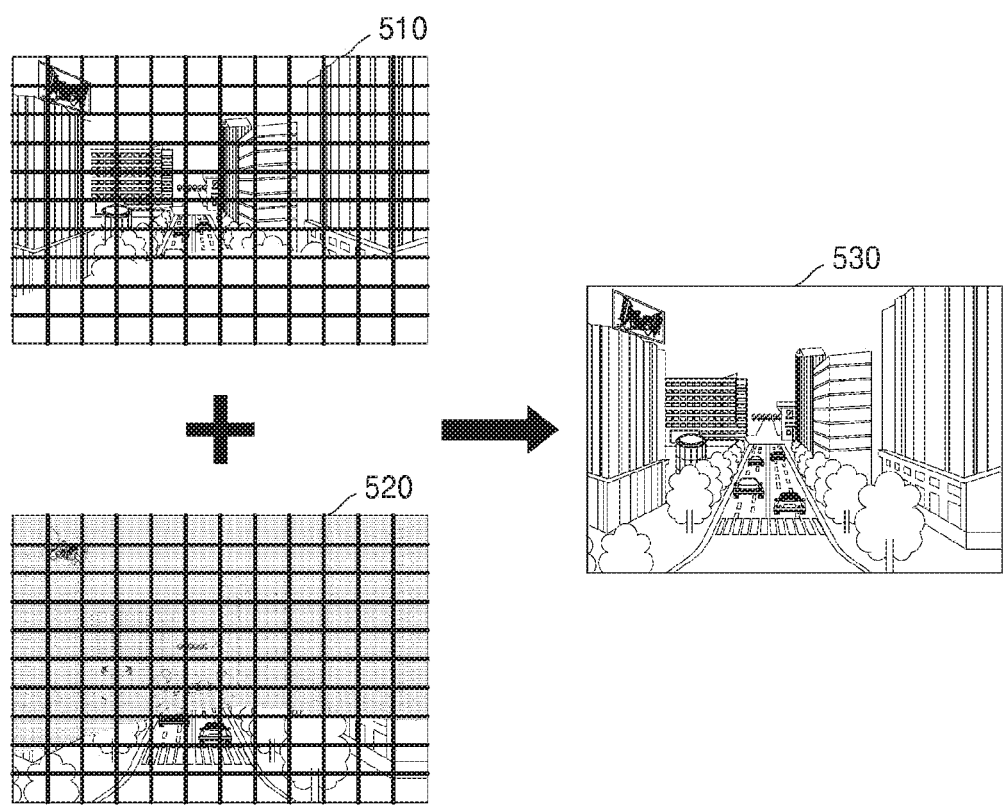
FIGS. 5 and 6 illustrate how an electronic apparatus creates a composite image using a plurality of first areas and a plurality of second areas, according to some embodiments of the disclosure.
Figure 6:
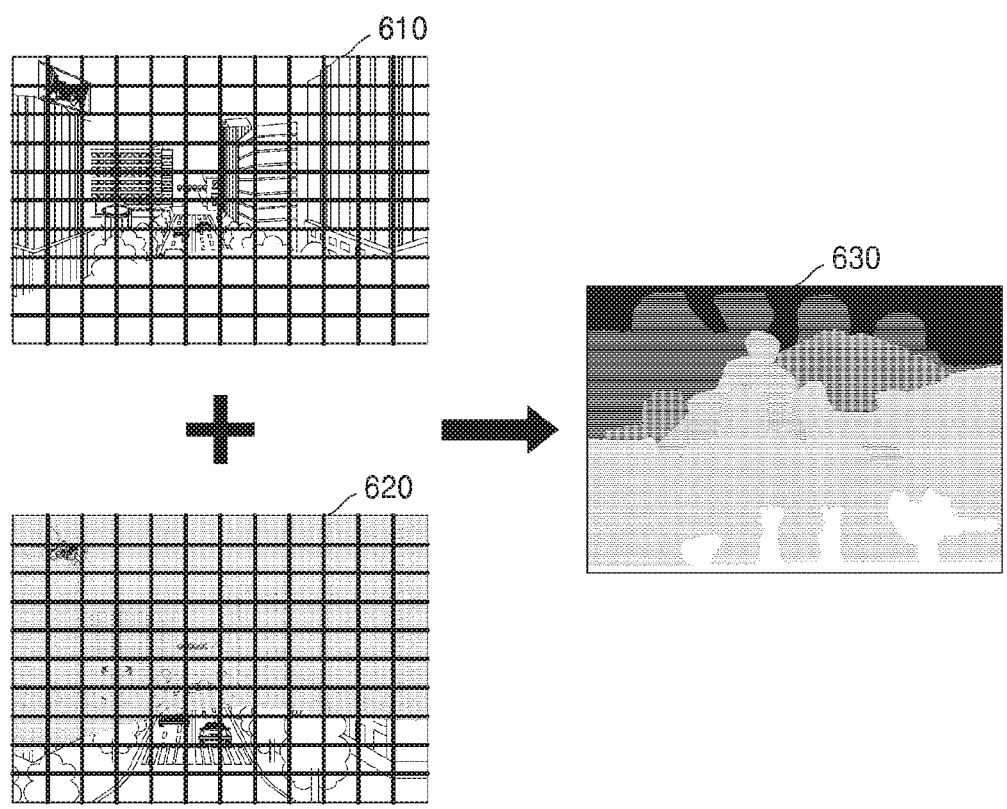

FIGS. 5 and 6 illustrate how an electronic apparatus creates a composite image using a plurality of first areas and a plurality of second areas, according to some embodiments of the disclosure.

Referring to FIG. 5, the electronic device 100 may divide a first image 510 into a plurality of first areas by dividing the first image 510 into a plurality of blocks. The electronic device 100 may divide a second image 520 into a plurality of second areas by dividing the second image 520 into a plurality of blocks. In an embodiment of the disclosure, a first image sensor for capturing the first image 510 and a second image sensor for capturing the second image 520 may be arranged at a distance from each other in the electronic apparatus 100, and the distance between the first and second image sensors may be preset.

Furthermore, the electronic apparatus 100 may obtain image data of the plurality of first areas and image data of the plurality of second areas. The electronic apparatus 100 may select a second area matching a particular one of the plurality of first areas by comparing the image data of the plurality of first areas with the image data of the plurality of second areas. For example, the electronic apparatus 100 may select first and second areas that include a particular subject. The electronic apparatus 100 may obtain distance information of the first and second areas including the particular subject based on the distance between the first and second image sensors. For example, the first area including the particular subject and the second area including the particular subject may have the same distance information. With repetition of the above processes, the electronic apparatus 100 may obtain distance information of each of the plurality of first and second areas.

The electronic apparatus 100 may create a composite image 530 that represents the surroundings of the vehicle 1000 using a portion of the first image 510 and the second image 520, based on the distance information of each of the plurality of first and second areas. For example, the electronic apparatus 100 may insert a clearer one of a particular first area and a second area that matches the particular first area to the composite image 530. For example, no crosswalk may be identified in the first areas that match the second areas including a crosswalk of the second image 520, so the electronic apparatus 100 may determine to insert the second areas including the crosswalk to the composite image 530. Furthermore, an electronic signboard may be identified in both the first areas including the electronic signboard on a building in the first image 510 and second areas including the electronic signboard on the building, in which case the first areas show the electronic signboard more clearly, so the electronic apparatus 100 may determine to insert the first areas including the electronic signboard on the building to the composite image 530. Accordingly, the electronic apparatus 100 may obtain a wide dynamic range (WDR) image having a wider dynamic range than the first image 510 and the second image 520 or an image with noise further reduced than in the first image 510 and the second image 530 as the composite image 530.

Referring to FIG. 6, as described above, the electronic apparatus 100 may create a composite image 630 that represents the surroundings of the vehicle 1000 using a portion of a first image 610 and a second image 620, based on the distance information of each of the plurality of first and second areas. For example, the electronic apparatus 100 may create a depth image that represents distances between subjects included in at least one of the first and second images 610 and 620 and the vehicle 1000 based on disparity between the first areas including a particular subject and the second areas including the particular subject. For example, the electronic apparatus 100 may calculate a distance of the particular subject included in both the first image 610 and the second image 620 based on the distance between the first and second image sensors. Furthermore, a distance of a subject included in only one of the first and second images 610 and 620, which is close to the vehicle 1000, may be estimated based on the calculated distance between the particular subject and the vehicle 1000. Based on distance information of each of the plurality of first areas and second areas, the electronic apparatus 100 may create the composite image 630 to make it feel a sense of distance between the subjects. For example, the electronic apparatus 100 may create a depth image in which a subject at a close distance to the vehicle 1000 look bright and a subject at a far distance to the vehicle 1000 look dark.

Figure 7:
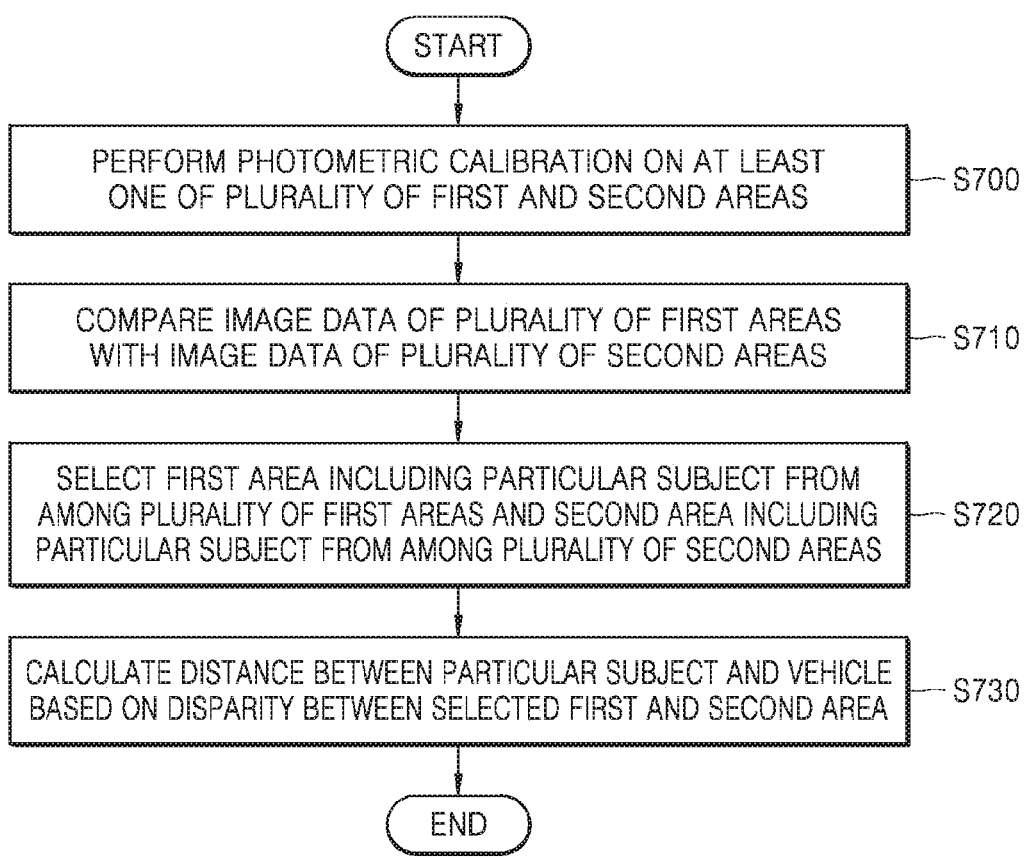
FIG. 7 is a flowchart of a method in which an electronic apparatus calculates a distance between a particular subject and a vehicle, according to some embodiments of the disclosure.

FIG. 7 is a flowchart of a method in which an electronic apparatus calculates a distance between a particular subject and the vehicle 1000, according to some embodiments of the disclosure.

In operation S700, the electronic apparatus 100 may perform photometric calibration on at least one of the plurality of first and second areas. As the first image sensor and the second image sensor have different physical characteristics, the electronic apparatus 100 may perform the photometric calibration on the first image or the second image to adjust visibility between the first image captured by the first image sensor and the second image captured by the second image sensor. With the photometric calibration, the electronic apparatus 100 may improve identifiability for the subjects included in at least one of the first and second images. Accordingly, the electronic apparatus 100 may create a clearer composite image. In an embodiment of the disclosure, for photometric calibration on the first image, the electronic apparatus 100 may determine whether to perform the photometric calibration on the entire first image or on each of the plurality of first areas in the first image.

The photometric calibration may be performed as preprocessing for obtaining feature information of the first image and second image and creating the composite image. The photometric calibration may be performed in the electronic apparatus 100 or in another electronic apparatus (not shown) or a server (not shown) communicatively connected with the electronic apparatus 100. When the photometric calibration is performed in the other electronic apparatus (not shown) or the server (not shown), the electronic apparatus 100 may request the other electronic apparatus (not shown) or the server (not shown) to provide a result of performing the photometric calibration on the first image data and/or the second image data while transmitting first image data of the first image and second image data of the second image to the other electronic apparatus (not shown) or the server (not shown).

A specific example of performing the photometric calibration will be described later with reference to FIG. 8.

In operation S710, the electronic apparatus 100 may compare image data of a plurality of first areas with image data of a plurality of second areas. The electronic apparatus 100 may compare the image data of the plurality of first areas with the image data of the plurality of second areas to determine a particular second area corresponding to a particular one of the plurality of first areas. Alternatively, the electronic apparatus 100 may compare image data of a plurality of first areas that underwent the photometric calibration with image data of a plurality of second areas. In an embodiment of the disclosure, the electronic apparatus 100 may compare certain signals obtained by processing image data of a plurality of first areas with certain signals obtained by processing the image data of the plurality of second areas in various methods. For example, the electronic apparatus 100 may compare sensitivity data of the plurality of first areas and sensitivity data of the plurality of second areas.

In operation S720, the electronic apparatus 100 may select a first area including a particular subject from among the plurality of first areas and a second area including a particular subject from among the plurality of second areas based on the comparison. The electronic apparatus 100 may select areas including the same subject from the first image and the second image, based on the result of comparing image data of a plurality of first areas with image data of a plurality of second areas. For example, the areas including the same subject may have similar sensitivity data. In this case, the electronic apparatus 100 may select a second area having a similar waveform to a waveform of sensitivity data of a first area by comparing sensitivity data of the plurality of first areas with sensitivity data of the plurality of second areas.

In operation S730, the electronic apparatus 100 may calculate a distance between the particular subject and the vehicle 1000 based on disparity between the selected first area and the selected second area. As the first and second image sensors of the electronic apparatus 100 are arranged separately from each other, the electronic apparatus 100 may capture images at different viewing angles depending on the distance between the first and second image sensors. Accordingly, the electronic apparatus 100 may create different first and second images, and create a composite image that represents a sense of depth and reality around a real vehicle by synthesizing a portion of the first image and a portion of the second image. The electronic apparatus 100 may calculate a distance between the particular subject and the vehicle 1000 based on the disparity between the first area and the second area including the particular subject when the distance between the first and second image sensors is preset.

A specific example of calculating a distance between a particular subject and the vehicle 1000 will be described later with reference to FIG. 10.

Figure 8:
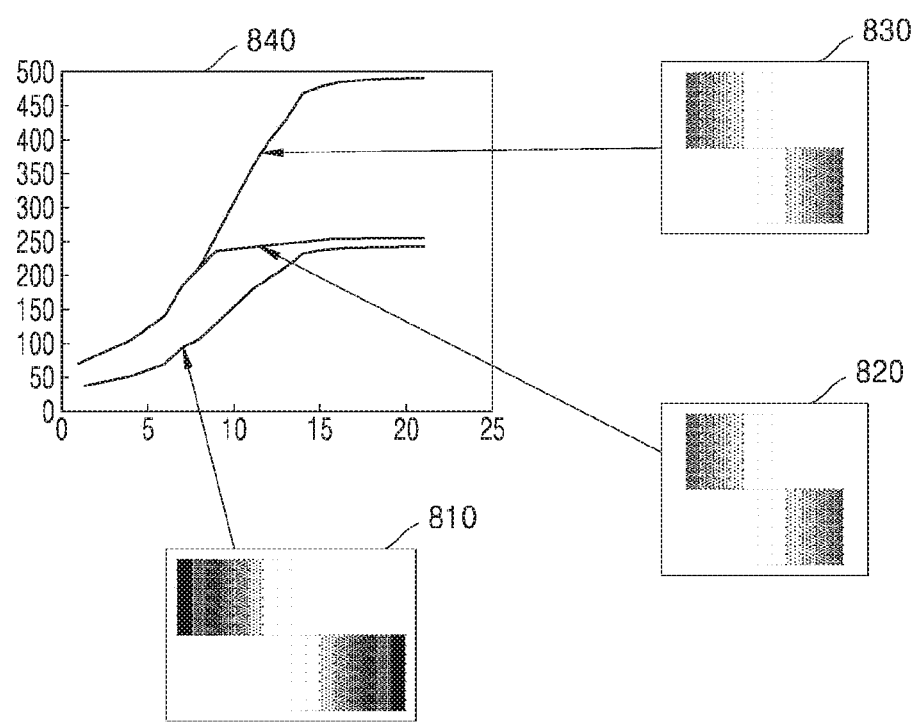
FIG. 8 illustrates how an electronic apparatus performs photometric calibration, according to some embodiments of the disclosure.

FIG. 8 illustrates how an electronic apparatus performs photometric calibration, according to some embodiments of the disclosure.

Referring to FIG. 8, first image data 810 representing brightness of a first image captured by a high-sensitivity sensor, a first image sensor, may have a wider dynamic range. Second image data 820 representing brightness of a second image captured by a normal-sensitivity sensor, a second image sensor, may have a narrow dynamic range. Adjustment of visibility between the first image and the second image may be required to output a composite image using the first image and the second image, in which case the electronic apparatus 100 may perform photometric calibration on the first image or the second image. For example, the electronic apparatus 100 may perform photometric calibration on the first image to obtain photometrically calibrated third image data 830.

To obtain the third image data 830 from photometric calibration on the first image, the electronic apparatus 100 may have captured a grayscale pattern chart or a color chart in advance under illumination of different brightnesses. Accordingly, the electronic apparatus 100 may obtain a graph 840 that represents pixel values of the first image data 810, the second image data 820, and the third image data 830 about brightness values of the grayscale pattern chart or the color chart. In an embodiment of the disclosure, the electronic apparatus 100 may perform photometric calibration on the first image to model a relation between a pixel value of the third image data 830 from photometric calibration on the first image and a pixel value of the second image data 820 of the second image as various types of function. For example, the relation between a pixel value of the first image and a pixel value of the second image may be modeled in a linear expression, y=f(x)=ax+b. Alternatively, f(x) may be a polynomial expression, such as a quadratic expression, a cubic expression, etc., which may be in the form of a logarithmic function or an exponential function. For example, constants a and b of y=ax+b may be derived by a linear regression method or a curve fitting method to find the relation between a pixel value of the first image and a pixel value of the second image through a least square method.

Figure 9:
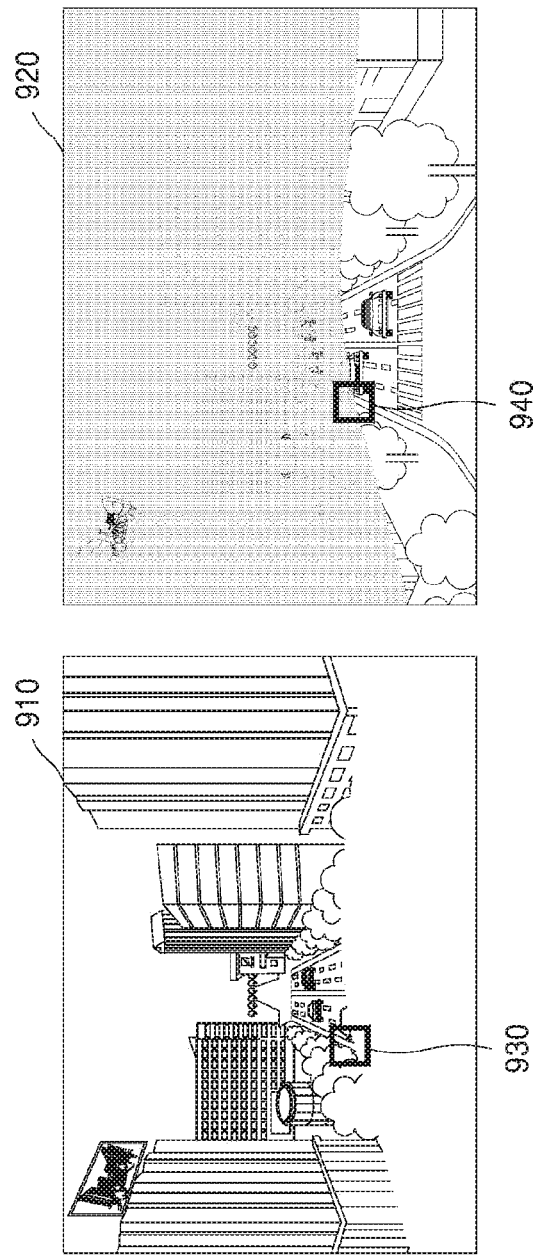
FIG. 9 illustrates how an electronic apparatus selects a first area including a particular subject from a first image and a second area including a particular subject from a second image, according to some embodiments of the disclosure.

FIG. 9 illustrates how an electronic apparatus selects a first area including a particular subject from a first image and a second area including a particular subject from a second image, according to some embodiments of the disclosure.

Referring to FIG. 9, as the first and second image sensors differ in sensitivity, subjects hardly identified in a second image 920 may be identifiable in a portion of a first image 910. Furthermore, subjects hardly identified in the first image 910 may be identifiable in a portion of the second image 920. Moreover, there may be a particular subject identifiable in both the first image 910 and the second image 920. To calculate a distance between a particular subject and the vehicle 1000, the electronic apparatus 100 may select a first area 930 including the particular subject in the first image 910 and a second area 940 including the particular subject in the second image 920.

The electronic apparatus 100 may select areas including the same subject from the first image 910 and the second image 920, based on the result of comparing image data of a plurality of first areas with image data of a plurality of second areas. For example, the electronic apparatus 100 may select a first area 930 including a lane in the first image 910 and a second area 940 including the same lane in the second image 920.

The electronic apparatus 100 may determine an area corresponding to the first area 930 to be the second area 940 by comparing the image data of the first area 930 with the image data of the second area 940. As an area including the same subject may even have similar sensitivity data, for example, the electronic apparatus 100 may select the second area 940 having a similar waveform to a waveform of the sensitivity data of the first area 930 by comparing the sensitivity data of the first area 930 with the sensitivity data of the second area 940.

Figure 10:
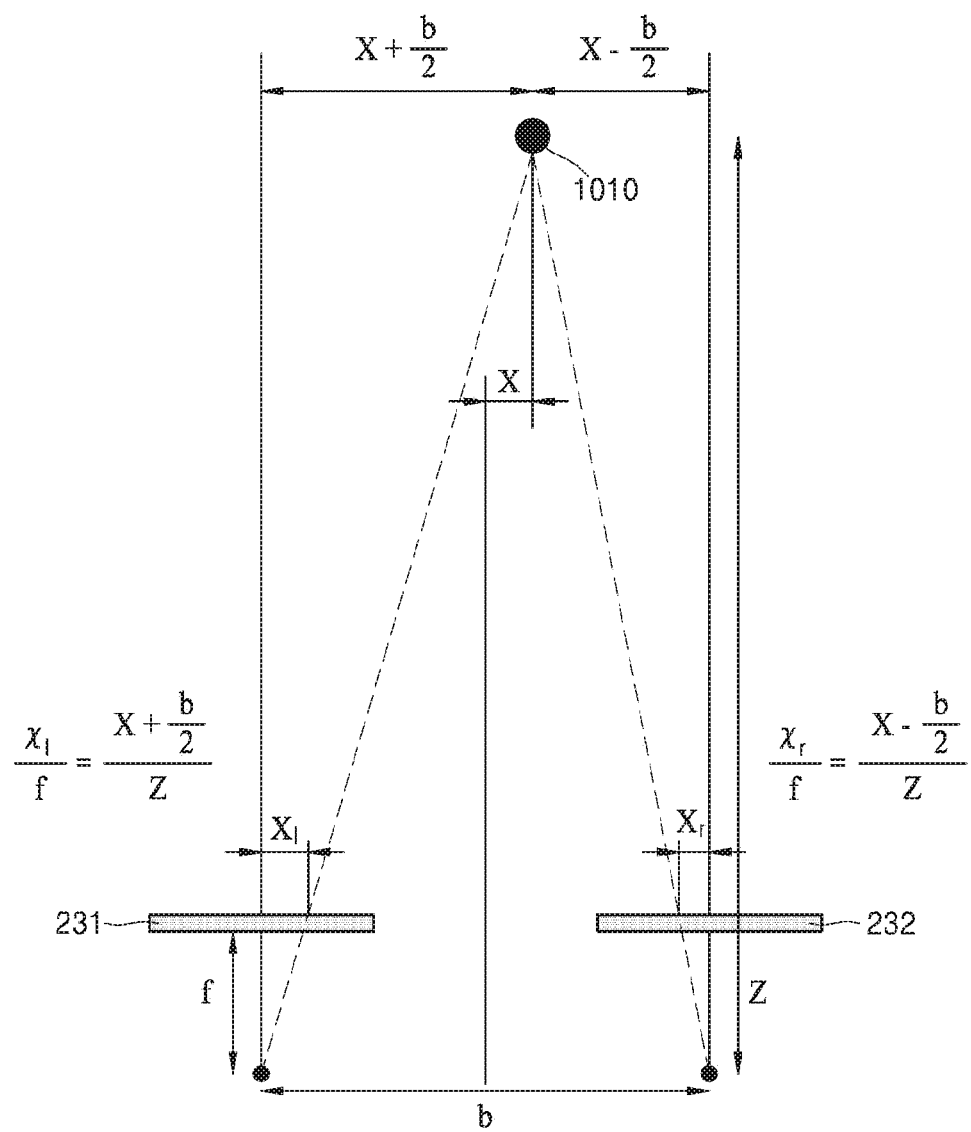
FIG. 10 illustrates how an electronic apparatus calculates a distance between a particular subject and a vehicle, according to some embodiments of the disclosure.

FIG. 10 illustrates how an electronic apparatus calculates a distance between a particular subject and a vehicle, according to some embodiments of the disclosure.

Referring to FIG. 10, the electronic apparatus 100 according to some embodiments of the disclosure may use a triangulation method to calculate a distance between a particular subject 1010 and the vehicle 1000.

Assume a distance from a straight line passing the center of the electronic device 100 and perpendicular to the first image sensor 231 to a particular subject 1010 to be 'x', a distance between the first image sensor 231 and the second image sensor 232 'b', a focal distance 'f', aperture level disparity '$x_l - x_r$', and a distance between the particular subject 1010 and the vehicle 1000 'Z'. Equations 1 and 2 may be derived according to characteristics of similar triangles whose corresponding sides have proportional length.

$$\frac{x_r}{f} = \frac{X - \frac{b}{2}}{Z} \quad \text{[Equation 1]}$$

As a right triangle with both sides $$X - \frac{b}{2}$$

and Z has a similar feature to a right angle with both sides $x_r$ and f, and corresponding sides of the triangles have proportional length, the equation 1 may be derived.

$$\frac{x_l}{f} = \frac{X + \frac{b}{2}}{Z} \quad \text{[Equation 2]}$$

As a right triangle with both sides $$X + \frac{b}{2}$$

and Z has a similar feature to a right angle with both sides $x_l$ and f, and corresponding sides of the triangles have proportional length, the equation 2 may be derived.

$$x_l - x_r = \frac{b \times f}{Z} \quad \text{[Equation 3]}$$

The aperture level disparity $x_l - x_r$ may be derived as in the equation 3 by subtracting the equation 1 from the equation 2.

$$g(x_l - x_r) \propto \frac{b \times f}{Z} \quad \text{[Equation 4]}$$

When g(•) is a monotonic function, the sensor level disparity $g(x_l - x_r)$ may be proportional to the aperture level disparity $x_l - x_r$. As the particular subject 1010 is included in a first area in a first image captured by the first image sensor 231 and in a second area in a second image captured by the second image sensor 232, the disparity $g(x_l - x_r)$ may be caused between the first area and the second area. The distance b and the focal distance f between the first image sensor 231 and the second image sensor 232 may be preset in the electronic apparatus 100. Accordingly, when the electronic apparatus 100 captures two or more images from the first and second images 231 and 232 at the preset distance b, the electronic apparatus 100 may calculate the distance Z between the particular subject 1010 and the vehicle 1000.

According to the equation 4, the disparity $g(x_l - x_r)$ between the first and second areas is proportional to the distance b between the first and second image sensors 231 and 232 and the focal distance f, and inversely proportional to the distance Z between the particular subject 1010 and the vehicle 1000. For example, when the particular subject 1010 is taken by the first image sensor 231 and the second image sensor 232, and the particular subject 1010 is close to the vehicle 1000, there may be a big difference in position between the first image and the second image. Furthermore, when the particular subject 1010 is taken by the first image sensor 231 and the second image sensor 232, and the particular subject 1010 is far away from the vehicle 1000, there may be a small difference in position between the first image and the second image.

For example, when the particular subject 1010 is taken by the first image sensor 231 and the second image sensor 232, and the distance b between the first image sensor 231 and the second image sensor 232 is large, there may be a big difference in position between the first image and the second image. In this case, the disparity is large, and the electronic apparatus 100 may calculate the distance between the particular subject 1010 and the vehicle 1000 more accurately. Furthermore, when the focal distance f becomes large, the disparity is large, and the electronic apparatus 100 may calculate the distance between the particular subject 1010 and the vehicle 1000 more accurately.

Figure 11:
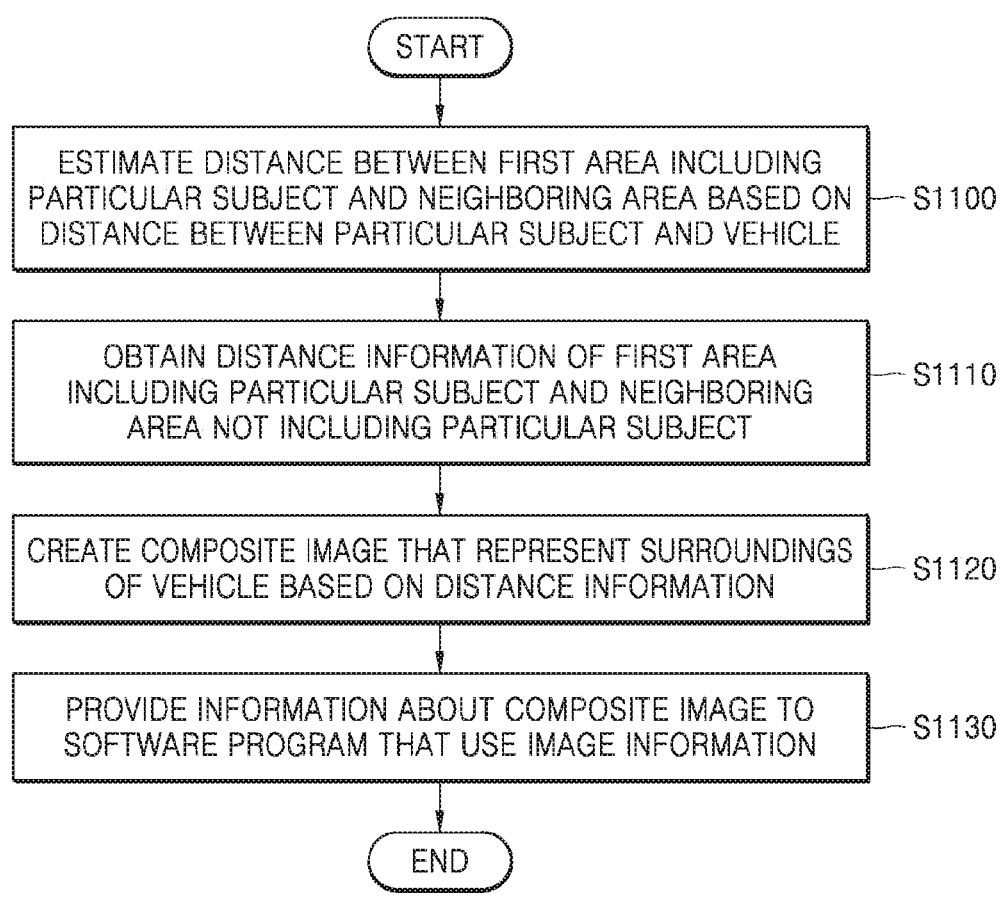
FIG. 11 is a flowchart of a method in which an electronic apparatus obtains distance information for a neighboring area not including a particular subject, according to some embodiments of the disclosure.

FIG. 11 is a flowchart of a method in which an electronic apparatus obtains distance information for a neighboring area not including a particular subject, according to some embodiments of the disclosure.

In operation S1100, the electronic apparatus 100 may estimate a distance of a neighboring area adjacent to a first area including a particular subject, based on a distance between the particular subject and the vehicle 1000. The neighboring area is an area adjacent to the first area including the particular subject without including the particular subject, and may or may not include a subject instead of the particular subject. The subject different from the particular subject may be included only one of the first image and the second image. When the first image includes a subject different from the particular subject, the subject different from the particular subject is taken even by the second image sensor but may not be identifiable because a portion including the subject different from the particular subject in the second image has low resolution or definition. Alternatively, when the first image includes a subject different from the particular subject, the subject different from the particular subject may not be taken by the second image sensor due to the difference of distance between the first image sensor and the second image sensor.

A specific example of estimating a distance of a neighboring area that does not include the particular subject will be described later in connection with FIG. 12.

In operation S1110, the electronic apparatus 100 may obtain distance information for a first area including a particular subject and a neighboring area that does not include the particular subject. The electronic apparatus 100 may obtain distance information of the first area including the particular subject by calculating a distance between the particular subject and the vehicle 1000 based on a distance between the first and second image sensors. Alternatively, the electronic apparatus 100 may obtain the distance information of the first area including the particular subject using a range sensor.

The electronic apparatus 100 may obtain the distance information for the neighboring area based on the distance information of the first area. Alternatively, when the neighboring area includes a subject different from the particular subject, the electronic apparatus 100 may obtain distance information for the neighboring area by calculating a distance between the subject different from the particular subject and the vehicle 1000 using the range sensor.

In operation S1120, the electronic apparatus 100 may create a composite image that represents the surroundings of the vehicle, based on the distance information. The operation S1120 corresponds to the operation S450, so the detailed description will be omitted.

In operation S1130, the electronic apparatus 100 may provide information about the composite image for a software program that uses image information. The electronic apparatus 1000 may provide information about the composite image that represents the surroundings of the vehicle 1000 for the software program that uses image information. For example, the electronic apparatus 100 may provide the information about the composite image to at least one of a navigation program, an autonomous driving program, and a road information collecting program. The software program that uses image information may be a software program to be executed in the vehicle 1000, without being limited thereto. The software program that uses image information may be running in another electronic apparatus (not shown) communicatively connected to the electronic apparatus 100.

Figure 12:
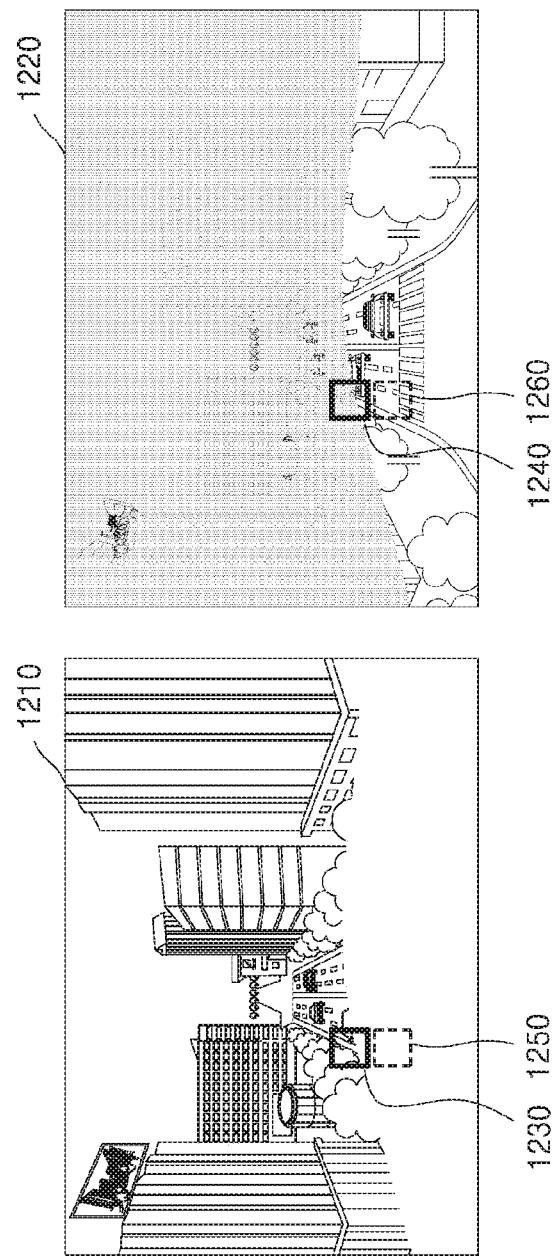
FIG. 12 illustrates how an electronic apparatus estimates a distance to a neighboring area, according to some embodiments of the disclosure.

FIG. 12 illustrates how an electronic apparatus estimates a distance of a neighboring area, according to some embodiments of the disclosure.

Referring to FIG. 12, as the first and second image sensors differ in sensitivity, subjects that are identifiable in a first image 1210 may be hardly identified in a second image 1220. Furthermore, subjects identifiable in the second image 1220 may be hardly identified in the first image 1210. Moreover, there may be a particular subject identifiable in both the first image 1210 and the second image 1220, and there may be a subject different from the particular subject, which is identifiable in the second image 1220 but hardly identified in the first image 1210. For example, a first area 1230 including a lane in the first image 1210 may correspond to a second area 1240 including the same lane in the second image 1220. A neighboring area 1260 including a crosswalk in the second image 1220 may correspond to another first area 1250 in the first image 1210.

The electronic apparatus 100 may obtain the distance information for the neighboring area 1260 adjacent to the second area 1240 based on the distance information of the second area 1240. The electronic apparatus 100 may obtain the distance information for the neighboring area 1260 based on the distance between the particular subject included in the second area 1240 and the vehicle 1000. For example, the electronic apparatus 100 may estimate a distance between the crosswalk included in the neighboring area 1260 and the vehicle 1000 based on a distance between the lane included in the second area 1240 and the vehicle 1000. The electronic apparatus 100 may obtain the distance information for the neighboring area 1260 based on a difference in the number of pixels between the second area 1240 and the neighboring area 1260. In an embodiment of the disclosure, the distance of the neighboring area 1260 may be estimated based on a difference of the number of pixels from the center of the second area 1240 and the center of the neighboring area 1260. For example, when the second area 1240 and the neighboring area 1260 each include 9 pixels and are adjacent to each other, there may be a difference as many as 3 pixels from the center of the second area 1240 to the center of the neighboring area 1260. In this case, when the electronic apparatus 100 calculates the distance between the lane included in the second area 1240 and the vehicle 1000 as 20 meters, the electronic apparatus 100 may estimate the distance between the crosswalk included in the neighboring area 1260 and the vehicle 1000 as 14 meters.

Figure 13:
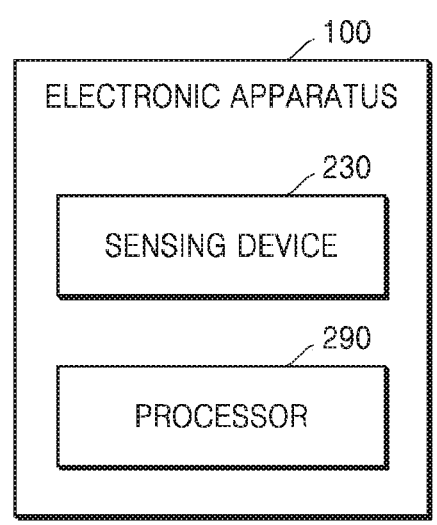
FIG. 13 is a block diagram of hardware of an electronic apparatus, according to some embodiments of the disclosure.
Figure 14:
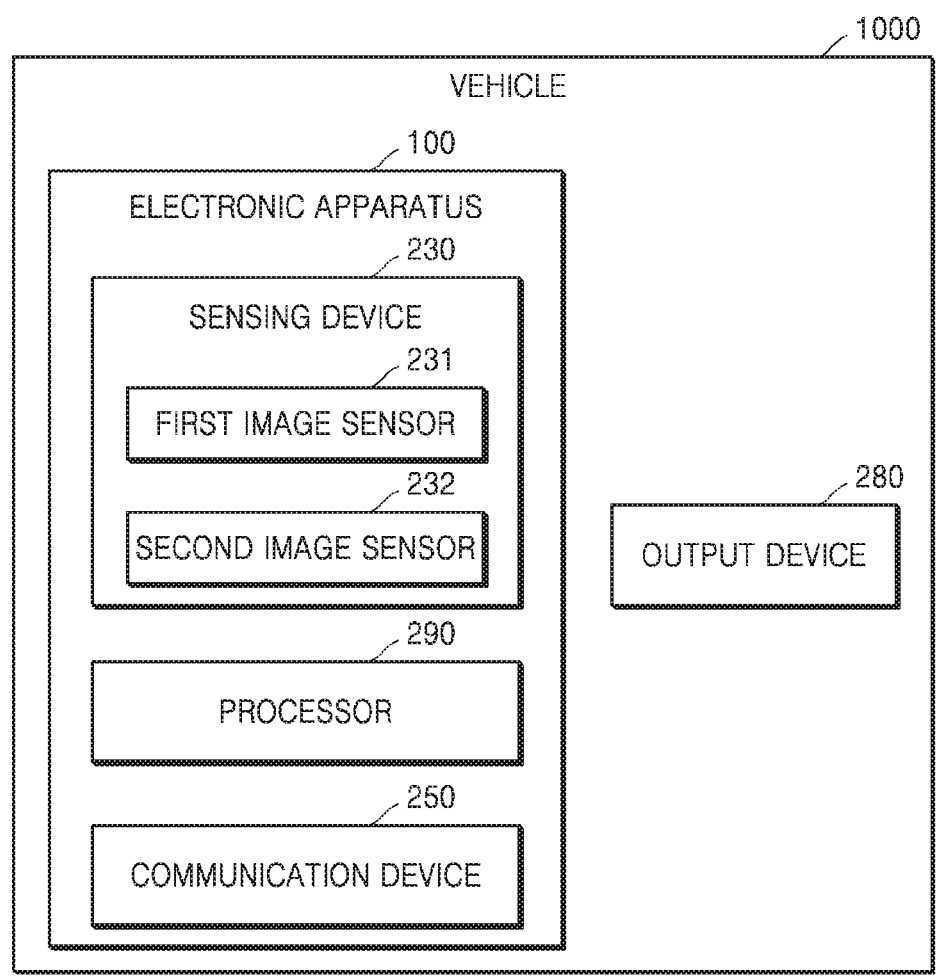
FIGS. 14 and 15 are block diagrams of hardware of an electronic apparatus and a vehicle, according to some embodiments of the disclosure.
Figure 15:
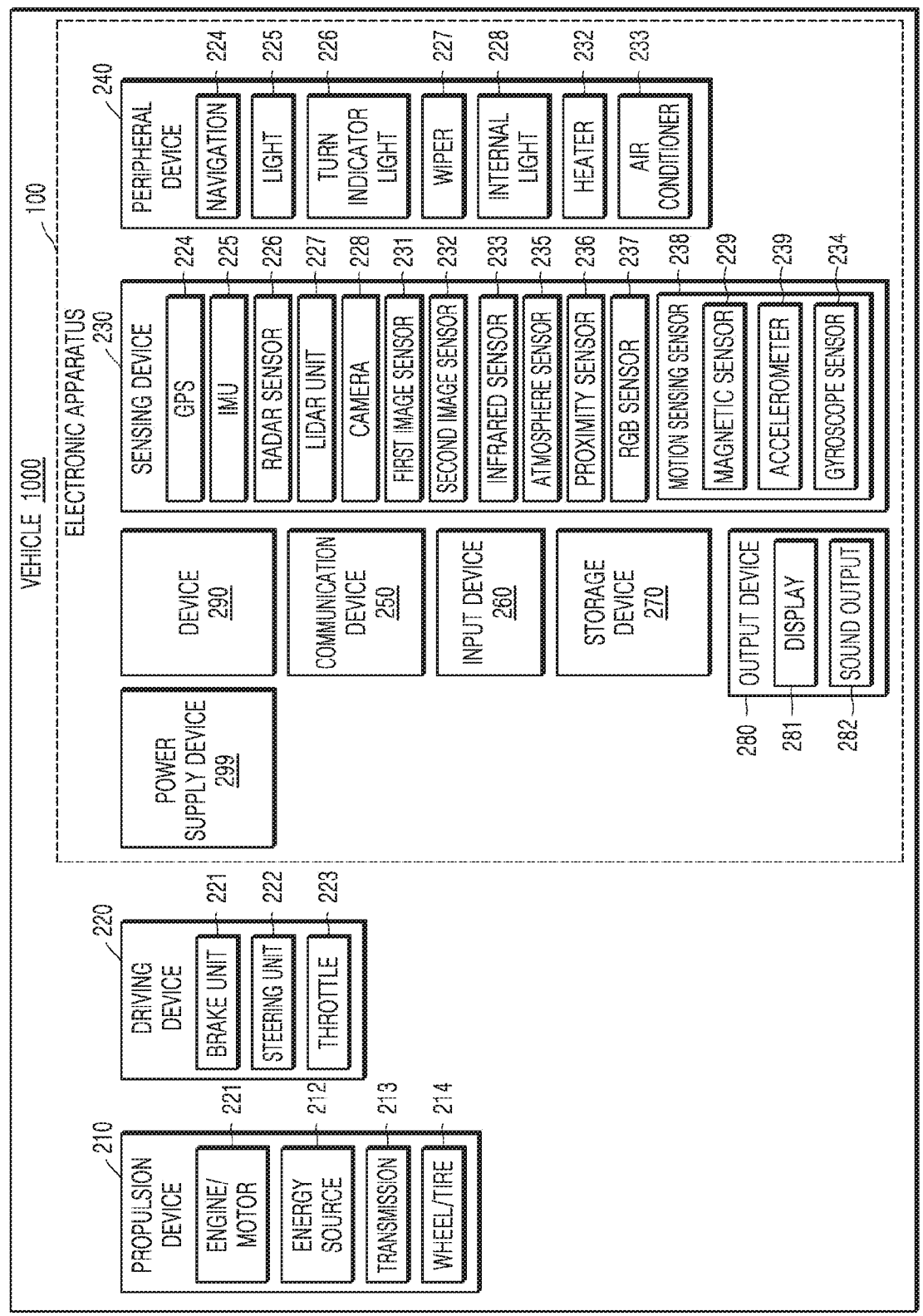

FIG. 13 is a hardware block diagram of an electronic apparatus 100, according to some embodiments of the disclosure, and FIGS. 14 and 15 are hardware block diagrams of an electronic apparatus and a vehicle, according to some embodiments of the disclosure.

As, shown in FIG. 13, the electronic apparatus 100 according to some embodiments of the disclosure may include a sensing device 230 and a processor 290. All components shown in FIG. 13 are not, however, essential for the electronic apparatus 100. The electronic apparatus 100 may be implemented with more or fewer components than in FIG. 13. For example, as shown in FIGS. 14 and 15, the electronic apparatus 100 according to some embodiments of the disclosure may further include at least one of a power supply device 299, a communication device 250, an input device 260, a storage device 270, a peripheral device 240, and an output device 280. Furthermore, the vehicle 1000 may include a propulsion device 210 and a driving device 220 as shown in FIG. 14, without being limited thereto, and may include some of the components of the electronic apparatus 100. Moreover, the electronic apparatus 100 may be a different device having the components of the electronic apparatus 100 as shown in FIG. 13, in which case, the electronic apparatus 100 may be communicatively connected to a head unit in the vehicle 1000 to create a composite image that represents the surroundings of the vehicle 1000.

Functions of the components to be included in the vehicle 1000 and the electronic apparatus 100 will now be described in more detail with reference to FIGS. 13 to 15.

The propulsion device 210 may include an engine/motor 211, an energy source 212, a transmission 213, and a wheel/tire 214.

The engine/motor 211 may be any combination of an internal combustion engine, an electric motor, a vapor engine, and a Stirling engine. For example, when the vehicle 1000 is a gas-electric hybrid car, the engine/motor 211 may correspond to a gasoline engine and electric motor.

The energy source 212 may be an energy supply source for supplying full or partial power to the engine/motor 211. The engine/motor 211 may be configured to convert the energy source 212 to mechanical energy. For example, the energy source 212 may be at least one of gasoline, diesel, propane, other compressed gas based fuels, ethanol, a solar panel, a battery, and other electric power sources. Alternatively, the energy source 212 may be at least one of a fuel tank, a battery, a capacitor, and a flywheel. The energy source 212 may supply energy to systems and devices in the vehicle 1000.

The transmission 213 may be configured to transfer mechanical power from the engine/motor 211 to the wheel/tire 214. For example, the transmission 213 may include at least one of a gearbox, a clutch, a differential device, and driving shafts. When the transmission 213 includes the driving shafts, the driving shafts may include one or more car axles arranged to couple with the wheel/tire 214.

The wheel/tire 214 may have various forms including forms for unicycles, bicycles/motorbikes, tricycles, or four-wheel automobiles/trucks. For example, it may have other wheel/tire forms such as those including six or more wheels. The wheel/tire 214 may include at least one wheel fixedly attached to the transmission 213, and at least one tire coupled to a rim of the wheel that may contact a driving surface.

The driving device 220 may include a brake unit 221, a steering unit 222, and a throttle 223. The brake unit 221 may be a combination of mechanisms configured to slow down the vehicle 1000. For example, the brake unit 221 may use friction to reduce the speed of the wheel/tire 214. The steering unit 222 may be a combination of mechanisms configured to control the direction of the vehicle 1000. The throttle 223 may be a combination of mechanisms configured to control the speed of the vehicle 1000 by controlling operation speed of the engine/motor 211. Furthermore, the throttle 223 may control an amount of fuel-air mixture gas flowing into the engine/motor 211 by controlling throttle opening, and control power and driving force by controlling throttle opening.

The sensing device 230 may include a plurality of sensors configured to detect information about an environment in which the vehicle 1000 is put, as well as one or more actuators configured to modify positions and/or orientation of the sensors. For example, the sensing device 230 may include the first image sensor 231 and the second image sensor 232. Furthermore, the sensing device 230 may include at least one of a global positioning system (GPS) 224, an inertial measurement unit (IMU) 225, a radar unit 226, a Lidar unit 227, an infrared sensor 233, an atmosphere sensor 235, a proximity sensor 236, and an RGB sensor 237, without being limited thereto. Those of ordinary skill in the art may intuitively infer the functions of the respective sensors, so the detailed description thereof will be omitted.

Furthermore, the sensing device 230 may include a motion sensing device 238 capable of sensing motion of the vehicle 1000. The motion sensing device 238 may include a magnetic sensor 229, an acceleration sensor 239, and a gyroscope sensor 234.

The GPS 224 may be a sensor configured to estimate a geographical location of the vehicle 1000. Specifically, the GPS 224 may include a transceiver configured to estimate the location of the vehicle 1000 on the earth.

The IMU 225 may be a combination of sensors configured to detect changes in location and orientation of the vehicle 1000 based on inertial acceleration. For example, the combination of sensors may include accelerometers and gyroscopes.

The radar unit 226 may be a sensor configured to detect objects around the vehicle 1000 using radio signals. Furthermore, the radar unit 226 may be configured to detect speeds and/or directions of the objects.

The Lidar unit 227 may be a sensor configured to detect objects around the vehicle 1000 using laser. More specifically, the Lidar unit 227 may include a laser light source and/or laser scanner configured to emit laser and a detector configured to detect laser reflection. The Lidar unit 227 may be configured to operate in coherent detection mode (e.g., using heterodyne detection) or incoherent detection mode. Furthermore, the electronic apparatus 100 may further include an ultrasound sensor (not shown) for detecting objects around the vehicle 1000.

The first image sensor 231 and the second image sensor 232 may be a still camera or a video camera for capturing an image of the inside or outside of the vehicle 1000. The first image sensor 231 and the second image sensor 232 may differ in physical characteristics such as sensitivity. The first and second image sensors 231 and 232 may be arranged at a distance to each other in the electronic apparatus 100, and controlled to capture images in substantially the same direction. Furthermore, the electronic apparatus 100 may include not only the first and second sensors 231 and 232 but also at least one of third, fourth, and fifth sensors (not shown), in which case the plurality of image sensors may be arranged at different locations on the inside or outside of the vehicle 1000.

The peripheral device 240 may include a navigation system 241, a light 242, a turn indicator light 243, a wiper 244, an internal light 245, a heater 246, and an air conditioner 247.

The navigation system 241 may be a system configured to determine a driving route for the vehicle 1000. The navigation system 241 may be configured to dynamically update the driving route while the vehicle 1000 is driving. For example, the navigation system 241 may use data from the GPS 224 and maps to determine the driving route for the vehicle 1000.

The storage device 270 may include a magnetic disc drive, an optical disc drive, and a flash memory. Alternatively, the storage device 270 may be a portable USB data storage device. The storage device 270 may store system software for executing the examples related to the disclosure. The system software for executing the examples related to the disclosure may be stored in a portable storage medium.

The communication device 250 may include at least one antenna for wirelessly communicating with another device. For example, the communication device 250 may be used to wirelessly communicate with a cellular network or any other radio protocol and system through WiFi or Bluetooth. The communication device 250 controlled by the processor 290 may transmit or receive wireless signals. For example, the processor 290 may run a program included in the storage device 270 for the communication device 250 to transmit or receive wireless signals with the cellular network.

The input device 260 refers to a means to input data to control the vehicle 1000. For example, the input device 260 may include a key pad, a dome switch, a (capacitive, resistive, infrared detection type, surface acoustic wave type, integral strain gauge type, piezoelectric effect type) touch pad, a jog wheel, a jog switch, etc., without being limited thereto. Furthermore, the input device 260 may include a microphone, and the microphone may be configured to receive audio (e.g., a voice command) from a person on board the vehicle 1000.

The output device 280 may output an audio signal or a video signal, and the output device 280 may include a display 281 and a sound output 282.

The display 281 may include at least one of a liquid crystal display (LCD), a thin film transistor-liquid crystal display (TFT-LCD), organic light-emitting diodes (OLEDs), a flexible display, a 3D display, or an electrophoretic display. Furthermore, depending on a form of implementation of the output device 280, the output device 280 may include two or more displays 281.

The sound output 282 outputs audio data received from the communication device 250 or stored in the storage device 270. Furthermore, the sound output 282 may include a speaker, buzzer, etc.

The input device 260 and the output device 280 may include a network interface and may be implemented by a touch screen.

The processor 290 may control general operation of the relaying device 1000. For example, the processor 290 may generally control at least one of the propulsion device 210, the driving device 220, the sensing device 230, the peripheral device 240, the communication device 250, the input device 260, the storage device 270, the output device 280, and the power supply device 299 by executing the programs stored in the storage device 270.

The processor 290 may execute the programs stored in the storage device 270 to obtain feature information of each of the first and second images and create a composite image that represents surroundings of the vehicle 1000 using a portion of the first image and a portion of the second image based on the obtained feature information.

The processor 290 may control the first image sensor 231 to take the surroundings of the vehicle 1000 and create a first image. The processor 290 may control the second image sensor 232 to take the surroundings of the vehicle 1000 and create a second image. The processor 290 may control the first image sensor 231 and the second image sensor 232 to take images in the same direction.

The processor 290 may divide the first image into a plurality of first areas and the second image into a plurality of second areas. The processor 290 may divide the first image into the plurality of first areas by dividing the first image into a plurality of blocks. Furthermore, the processor 290 may divide the second image into the plurality of second areas by dividing the second image into a plurality of blocks. The processor 290 may perform photometric calibration on at least one of the plurality of first and second areas to identify a subject in the first image and a subject in the second image.

The processor 290 may obtain distance information of each of the plurality of first and second areas. The processor 290 may obtain the distance information based on a distance between the first and second image sensors 231 and 232, image data of the plurality of first areas, and image data of the plurality of second areas. The processor 290 may compare the image data of the plurality of first areas with the image data of the plurality of second areas, and based on the comparison, select a first area including a particular subject from among the plurality of first areas and a second area including the particular subject from among the plurality of second areas. The processor 290 may calculate a distance between the particular subject and the vehicle 1000 based on disparity between the selected first area and the selected second area. The processor 290 may estimate a distance of a neighboring area adjacent to the first area including the particular subject, based on the calculated distance between the particular subject and the vehicle 1000.

The processor 290 may create a composite image that represents the surroundings of the vehicle 1000 using a portion of the first image and a portion of the second image, based on the distance information of each of the plurality of first and second areas. The processor 290 may use the portions of the first and second images to create a WDR image or HDR image that has a wider dynamic range than the first image and the second image. The processor 290 may use the portions of the first and second images to create an image with noise further reduced than in the first and second images. The processor 290 may use the portions of the first and second images to create a depth image that represents a distance between the subject included in at least one of the first image and the second image and the vehicle 1000.

The processor 290 may provide information about the composite image that represents the surroundings of the vehicle 1000 for the software program that uses image information. For example, the processor 290 may provide the information about the composite image of the vehicle 1000 to at least one of a navigation program, an autonomous driving program, and a road information collecting program.

The power supply device 299 may be configured to provide power to some or all of the components of the vehicle 1000. For example, the power supply device 299 may include a rechargeable lithium-ion or lead-acid battery.

Some embodiments of the disclosure may be implemented in the form of a computer-readable recording medium that includes computer-executable instructions such as the program modules executed by the computer. The computer-readable recording medium may be an arbitrary available medium that may be accessed by the computer, including volatile, non-volatile, removable, and non-removable mediums. The computer-readable recording medium may also include a computer storage medium and a communication medium. The volatile, non-volatile, removable, and non-removable mediums may be implemented by an arbitrary method or technology for storage of information, such as computer-readable instructions, data structures, program modules, or other data. The communication medium may typically include computer-readable instructions, data structures, program modules, or other data or other transmission mechanism for modulated data signals like carrier waves, and include arbitrary information delivery medium.

In the specification, the term "module" may refer to a hardware component such as a processor or a circuit, and/or a software component executed by the hardware component such as the processor.

Several embodiments have been described, but a person of ordinary skill in the art will understand and appreciate that various modifications can be made without departing the scope of the disclosure. Thus, it will be apparent to those of ordinary skill in the art that the disclosure is not limited to the embodiments described, but can encompass not only the appended claims but the equivalents. For example, an element described in the singular form may be implemented as being distributed, and elements described in a distributed form may be implemented as being combined.

The scope of the disclosure is defined by the appended claims, and it will be understood by those of ordinary skill in the art that various changes in form and details may be made without departing from the spirit and scope of the disclosure as defined by the appended claims and their equivalents.

The invention claimed is:

1. An electronic apparatus in a vehicle for providing an image of surroundings of the vehicle, the electronic apparatus comprising:
    a first image sensor;
    a second image sensor; and
    a processor configured to:
    obtain feature information of a first image obtained by the first image sensor and a second image obtained by the second image sensor, wherein the feature information includes brightness information of the first image and the second image, and
    provide a composite image that represents the surroundings of the vehicle, by using a portion of the first image and a portion of the second image, based on the brightness information of the first image and the second image, wherein the composite image has a dynamic range wider than the first image and the second image.

2. The electronic apparatus of claim 1, wherein the processor is further configured to:
    divide the first image into a plurality of first areas,
    divide the second image into a plurality of second areas,
    obtain distance information of each of the plurality of first and second areas, and
    provide a composite image that represents the surroundings of the vehicle, by using the portion of the first image and the portion of the second image, based on the obtained distance information.

3. The electronic apparatus of claim 2, wherein the processor is further configured to obtain the distance information based on a distance between the first and second image sensors, image data of the plurality of first areas, and image data of the plurality of second areas.

4. The electronic apparatus of claim 3, wherein the processor is further configured to: compare the image data of the plurality of first areas with the image data of the plurality of second areas,
    select a first area including a particular subject from among the plurality of first areas and a second area including the particular subject from among the plurality of second areas based on the comparison, and
    calculate a distance between the particular subject and the vehicle based on a disparity between the selected first area and the selected second area.

5. The electronic apparatus of claim 4, wherein the processor is further configured to estimate a distance between the first area including the particular subject and a neighboring area based on the calculated distance,
    wherein the neighboring area does not include the particular subject.

6. The electronic apparatus of claim 2, wherein the processor is further configured to divide the first image into a plurality of first areas by dividing the first image into multiple blocks.

7. The electronic apparatus of claim 1, wherein the first image sensor and the second image sensor differ in physical characteristics.

8. The electronic apparatus of claim 1, wherein the first image sensor and the second image sensor capture images in the same direction and are separately arranged from each other.

9. The electronic apparatus of claim 1, wherein the composite image corresponds to at least one of a wide dynamic range (WDR) image having a wider dynamic range than the first image and the second image, an image with noise that is reduced more than in the first image and the second image, and a depth image that represents a distance between the vehicle and a subject included in at least one of the first image and the second image.

10. The electronic apparatus of claim 2, wherein the processor is further configured to perform photometric calibration on at least one of the plurality of first and second areas to identify a subject in the first image and a subject in the second image.

11. A method, performed in an electronic apparatus, of providing an image of surroundings of a vehicle, the method comprising:
    obtaining a first image by a first image sensor of the electronic apparatus;
    obtaining a second image by a second image sensor of the electronic apparatus;
    obtaining feature information of the first image and the second image, wherein the feature information includes brightness information of the first image and the second image; and
    providing a composite image that represents the surroundings of the vehicle, by using a portion of the first image and a portion of the second image, based on the brightness information of the first image and the second image, wherein the composite image has a dynamic range wider than the first image and the second image.

12. The method of claim 11, wherein obtaining the feature information comprises:
    dividing the first image into a plurality of first areas;

dividing the second image into a plurality of second areas; and obtaining distance information of each of the plurality of first and second areas, wherein providing the composite image comprises providing a composite image that represents the surroundings of the vehicle, by using the portion of the first image and the portion of the second image based on the obtained distance information.

13. The method of claim 12, wherein obtaining the distance information comprises obtaining the distance information based on a distance between the first and second image sensors, image data of the plurality of first areas, and image data of the plurality of second areas.

14. The method of claim 13, wherein obtaining the distance information comprises:

comparing the image data of the plurality of first areas with the image data of the plurality of second areas;

selecting a first area including a particular subject from among the plurality of first areas and a second area including the particular subject from among the plurality of second areas based on the comparison; and calculating a distance between the particular subject and the vehicle based on a disparity between the selected first area and the selected second area.

15. A non-transitory computer-readable recording medium having recorded thereon a program for causing a computer included in an electronic apparatus to perform a method comprising:

obtaining a first image by a first image sensor of the electronic apparatus;

obtaining a second image by a second image sensor of the electronic apparatus;

obtaining feature information of a first image obtained by the first image sensor and a second image obtained by the second image sensor, wherein the feature information includes brightness information of the first image and the second image; and providing a composite image that represents the surroundings of the vehicle, by using a portion of the first image and a portion of the second image, based on the brightness information of the first image and the second image, wherein the composite image has a dynamic range wider than the first image and the second image.

* * * * *